United States Patent
Hautanen-Kriel (10) Patent No.: US 12,066,988 B2
(45) Date of Patent: Aug. 20, 2024

(54) COMPUTER-AUTOMATED ANALYSIS AND VALIDATION SYSTEMS FOR DATA MODELS

(71) Applicant: Cigna Intellectual Property, Inc., Wilmington, DE (US)

(72) Inventor: Tracy L. Hautanen-Kriel, Canton, CT (US)

(73) Assignee: Cigna Intellectual Property, Inc., Wilmington, DE (US)

(*) Notice: Subject to any disclaimer, the term of this patent is extended or adjusted under 35 U.S.C. 154(b) by 975 days.

(21) Appl. No.: 16/933,299

(22) Filed: Jul. 20, 2020

(65) Prior Publication Data

US 2022/0019910 A1    Jan. 20, 2022

(51) Int. Cl.
G06F 16/21    (2019.01)

(52) U.S. Cl.
CPC .................. *G06F 16/212* (2019.01)

(58) Field of Classification Search
CPC ...... G06F 16/212; G06F 16/211; G06F 16/21; G06N 5/02
See application file for complete search history.

(56) References Cited

U.S. PATENT DOCUMENTS

| | | | |
|---|---|---|---|
| 9,910,953 B2 | 3/2018 | Adel | |
| 10,305,831 B2 | 5/2019 | Parikh | |
| 10,706,122 B2 | 7/2020 | Sabbavarpu | |
| 11,086,827 B1* | 8/2021 | Sainanee | G06F 16/211 |
| 2003/0083767 A1 | 5/2003 | Karlsberg | |
| 2006/0288046 A1 | 12/2006 | Gupta | |
| 2013/0317839 A1* | 11/2013 | Creswell | G06Q 10/00 705/2 |
| 2014/0279850 A1 | 9/2014 | Goyal | |
| 2014/0297356 A1* | 10/2014 | Jayade | G06F 16/21 705/317 |
| 2017/0293951 A1 | 10/2017 | Nolan | |
| 2018/0025011 A1 | 1/2018 | Aksionkin | |
| 2018/0191730 A1* | 7/2018 | Deters | G06F 16/9535 |
| 2018/0275988 A1 | 9/2018 | Shmaya | |
| 2018/0351788 A1 | 12/2018 | Tammana | |
| 2019/0266135 A1 | 8/2019 | Kumar | |

(Continued)

FOREIGN PATENT DOCUMENTS

| | | | |
|---|---|---|---|
| CN | 103699693 A | 4/2014 | |
| CN | 110659273 A | 1/2020 | |

*Primary Examiner* — Pierre M Vital
*Assistant Examiner* — Jedidiah P Ferrer
(74) *Attorney, Agent, or Firm* — Miller Johnson (57) ABSTRACT

A system includes a processor and a memory storing instructions. The instructions include, in response to receiving a first input indicating a first data model from a user device, obtaining the first data model and identifying objects within the first data model. The instructions include obtaining a set of rules and, for each rule of the set of rules, applying the rule to each object to determine an adherence of the object to the rule or a violation of the object of the rule. The instructions include generating a report that indicates, for each rule and for each object, the adherence of the object to the rule or the violation of the object of the rule and calculating an adherence score based on an overall adherence of the objects to the set of rules. The instructions include transmitting, for display on the user device, the generated report and adherence score.

20 Claims, 7 Drawing Sheets

(56) References Cited

U.S. PATENT DOCUMENTS

| | | |
|---|---|---|
| 2019/0318293 A1 | 10/2019 | Neuweg |
| 2020/0007582 A1 | 1/2020 | Dixit |
| 2020/0183794 A1* | 6/2020 | Dwarampudi ...... G06F 11/3409 |

* cited by examiner

COMPUTER-AUTOMATED ANALYSIS AND VALIDATION SYSTEMS FOR DATA MODELS

FIELD

The present disclosure relates to computer automation of analysis and more particularly to computer automation for validation of data models.

BACKGROUND

Within an entity, a variety of data models are created by a plurality of data modelers. These data models are subject to a governance review that determines whether the data model can be put into production or needs to be changed. The governance review is conducted manually and is time consuming. Further, feedback cannot be obtained during creation of data models. While such a review is necessary to gauge performance of data modelers as well as to ensure the data models adhere to industry and entity standards, the review process is lengthy and inefficient.

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A system includes at least one processor and a memory coupled to the at least one processor. The memory stores a data model database including data models, a rules database including rules, and instructions for execution by the at least one processor. The instructions include, in response to receiving a first input indicating a first data model from a user device of a user, obtaining the first data model from the data model database and identifying objects within the first data model. The instructions include obtaining a set of rules from the rules database and, for each rule of the set of rules, applying the rule to each object of the objects to determine an adherence of the object to the rule or a violation of the object of the rule. The instructions include generating a report that indicates, for each rule of the set of rules and for each object of the objects, the adherence of the object to the rule or the violation of the object of the rule and calculating an adherence score based on an overall adherence of the objects to the set of rules. The instructions include transmitting, for display on the user device, the generated report and the adherence score.

In other features, calculating the adherence score includes identifying, from the objects, a total number of objects adhering to each rule of the set of rules and calculating the adherence score as the total number of objects adhering to each rule divided by a total number of the objects.

In other features, each rule of the set of rules includes an indication of a category of a set of categories. In other features, the instructions include calculating a category adherence score for each category of the set of categories by identifying a subset of rules of the set of rules corresponding to a selected category of the set of categories and determining a total adherence to the selected category as each object of the objects adhering to each rule of the subset of rules. In other features, the instructions include determining a total number within the selected category as each object of the objects corresponding to the subset of rules and calculating a selected category adherence score as the total adherence to the selected category divided by the total number within the selected category.

In other features, the memory stores a report database, and the instructions include storing the generated report including the adherence score in the report database. In other features, the instructions include, in response to receiving a report request from the user device, obtaining a first report indicated in the report request from the report database and transmitting, for display on the user device, the first report. In other features, the rules database stores, for each rule of the set of rules, an indication that violation of the rule generates at least one of: a warning and a failure.

In other features, the instructions include, in response to receiving a rule add request, adding a rule included in the rule add request to the rules database and, in response to receiving a rule delete request, removing a rule included in the rule delete request from the rules database. In other features, the memory stores a data dictionary including definitions for the objects. In other features, the adherence score is calculated based on the overall adherence of the objects to the set of rules and an overall violation of the objects of the set of rules indicating a warning.

In other features, the generated report includes a table including each object of the objects and each rule of the rules and an indication of a pass, warning, or failure of the objects for the set of rules. In other features, the overall adherence of the objects to the set of rules includes violation of the object of the rule for each rule of the set of rules that indicates the violation of the object of the rule is a warning.

A method includes, in response to receiving a first input indicating a first data model from a user device of a user, obtaining the first data model from a data model database. The data model database stores data models. In other features, the method includes identifying objects within the first data model and obtaining a set of rules from a rules database. The rules database stores rules. In other features, the method includes, for each rule of the set of rules, applying the rule to each object of the objects to determine an adherence of the object to the rule or a violation of the object of the rule. In other features, the method includes generating a report that indicates, for each rule of the set of rules and for each object of the objects, the adherence of the object to the rule or the violation of the object of the rule. In other features, the method includes calculating an adherence score based on an overall adherence of the objects to the set of rules and transmitting, for display on the user device, the generated report and the adherence score.

In other features, calculating the adherence score includes identifying, from the objects, a total number of objects adhering to each rule of the set of rules and calculating the adherence score as the total number of objects adhering to each rule divided by a total number of the objects.

In other features, the method includes calculating a category adherence score for each category of a set of categories by identifying a subset of rules of the set of rules corresponding to a selected category of the set of categories. Each rule of the set of rules includes an indication of a category of the set of categories. In other features, the method includes determining a total adherence to the selected category as each object of the objects adhering to each rule of the subset of rules and determining a total number within the selected category as each object of the objects corresponding to the subset of rules. In other features, the method includes calculating a selected category adherence score as the total adherence to the selected category divided by the total number within the selected category.

In other features, the method includes storing the generated report including the adherence score in a report database. In other features, the method includes, in response to receiving a report request from the user device obtaining a first report indicated in the report request from the report database and transmitting, for display on the user device, the first report. In other features, the rules database stores, for each rule of the set of rules, an indication that violation of the rule generates at least one of: a warning and a failure.

In other features, the method includes, in response to receiving a rule add request, adding a rule included in the rule add request to the rules database and, in response to receiving a rule delete request, removing a rule included in the rule delete request from the rules database. In other features, the adherence score is calculated based on the overall adherence of the objects to the set of rules and an overall violation of the objects of the set of rules indicating a warning. In other features, the generated report includes a table including each object of the objects and each rule of the rules and an indication of a pass, warning, or failure of the objects for the set of rules.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings.

In the drawings, reference numbers may be reused to identify similar and/or identical elements.

DETAILED DESCRIPTION

Introduction

A model analyzing system prepares reports to validate data models by identifying errors and inconsistencies within a data model. The model analyzing system may be used by a manager or a data modeler who is building a data model to assess an overall "health" or compliance score to validate the data model. In various implementations, the model analyzing system displays a report, including scores for the various objects included in the data model, and stores the report in a report database for future review and assessment. While the model analyzing system is described with respect to analyzing and scoring data models, the same system can be used to analyze other types of code or diagram. Since the model analyzing system analyzes a data model based on a set of rules, the set of rules can be updated or adjusted based on the data model or code being analyzed.

The rules may include rules for table definitions, column definitions, and existence of data lineage information or definitions. The rules may be based on physical or logical rules and are categorized accordingly. Logical rules are related to those rules that ensure an object of a data model is properly defined and the relationships between the object and other objects within the model are defined. Physical rules may be related to specific implementations of the data model, such as limiting the physical length of a definition. The rules used to score the data models may further be based on data model industry standards or specific entity-based rules that an entity associated with the model analyzing system adheres to, such as preferred names. For example, table definitions are used to understand what the data is and how to use the data of the data model correctly, so one rule is that an object must be defined, table, columns, everything needs to be defined.

In addition to determining an overall score, the model analyzing system generates a variety of pass, warn, or fail indicators for each of the rules run against the data model, which create the overall score. In the generated report, the user running the model analyzing system can see which rules were followed, resulting in a pass, and those rules that were not followed, resulting in a warning or a failure. Certain rules result in a warning or a failure based on how egregious it is to break the particular rule. For example, a warning means that a rule was not followed, for example, a rule related to industry best practices; however, the data model will still operate correctly, but the data model can be better.

In various implementations, failure may result in the data model not operating correctly. Otherwise, the data model may operate including a failure; however, the failure should be fixed. Since rules are adhered to or violated, the rules are categorized or include an indicator regarding whether violating the rule results in a warning or a failure.

A manager or data modeler may use the model analyzing system in order to review the data modeler's work or to see how to improve the data model, if needed. In various implementations, the report may provide feedback regarding how to fix a particular warning or failure. For example, if a rule related to using a new business term instead of an old business term is violated, the report may include the new business term, allowing a data modeler to easily fix the problem. In various implementations, a data modeler may access a data dictionary database through the model analyzing system. The data dictionary database includes metadata or information describing data, including definitions, relationships, etc. The data modeler may access the data dictionary database via the model analyzing system to learn about data and data relationships.

As previously mentioned, the model analyzing system ensures the efficient use of data models by automatically identifying existing issues within a data model. This automated review of data models help improve knowledge about data already stored, increase availability of shared data models and data lineage across teams, and provide knowledge about how to use the data to team members, increase data availability.

In other words, the model analyzing system is an automated way to validate a data model, or a portion of a data model, against data modeling policy, data modeling general rules, and best practices. The model analyzing system provides a data modeler with an opportunity to assess a development data model before passing it off for review and implementation. The model analyzing system can also be used by managers for objectives and key results as well as key performance indicators.

High-Level Diagram

Figure 1:
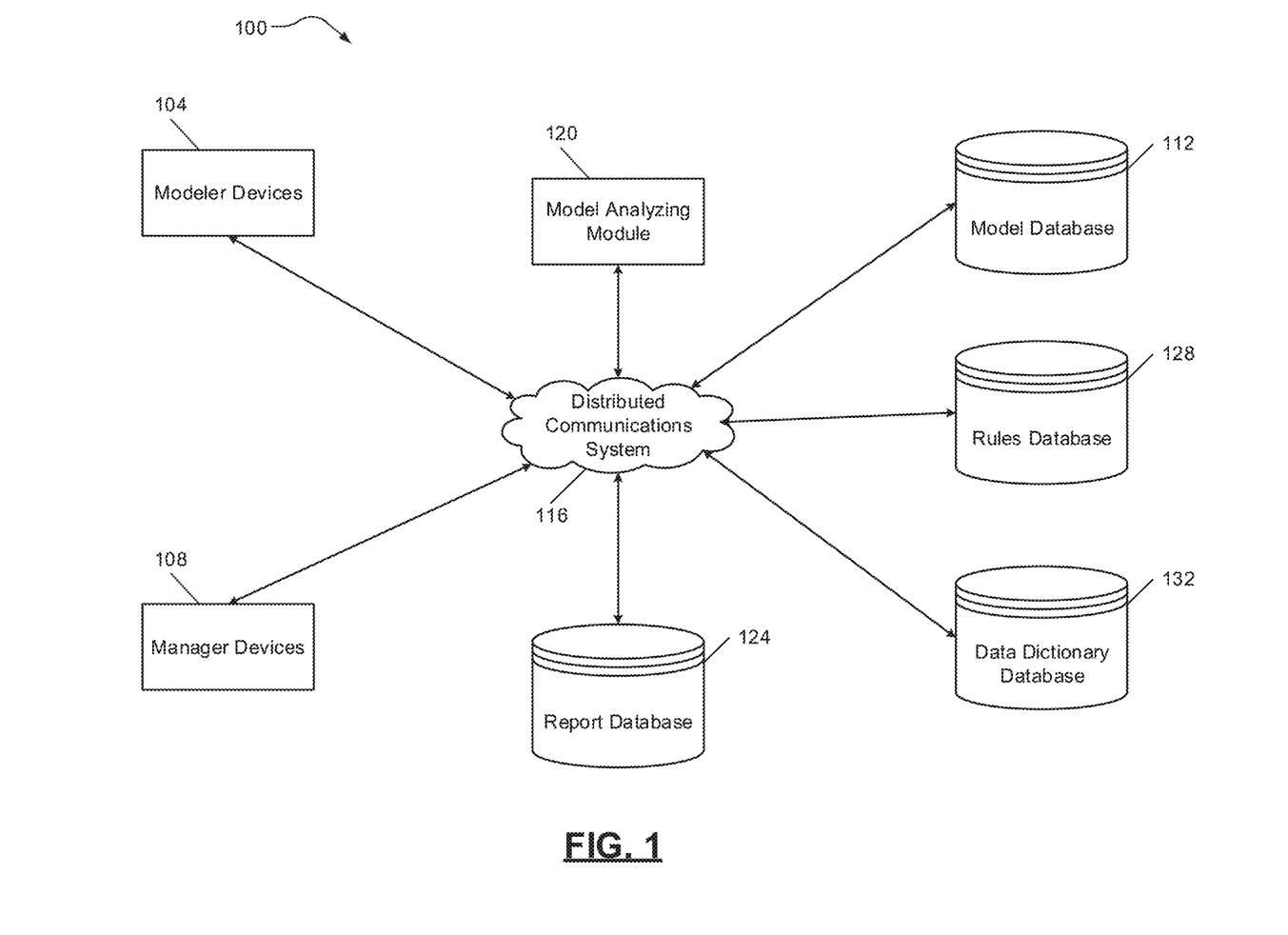
FIG. 1 is a high-level block diagram of an example model analyzing system according to principles of the present disclosure.

FIG. 1 is a high-level block diagram of an example model analyzing system 100 according to principles of the present disclosure. The model analyzing system 100 receives input from modeler devices 104 and manager devices 108, generally, user devices. The modeler devices 104 can upload data models to a model database 112 via a distributed communication system 116. The modeler devices 104 and the manager devices 108 can also request a model analyzing module 120 generate a report of a particular data model stored in the model database 112. The generated reports are stored in a report database 124.

The model analyzing module 120 selects data models from the model database 112 and applies rules to the data models. The rules are stored in a rules database 128. A data dictionary database 132 stores a data dictionary including metadata, describing the data of databases or data models. In various implementations, the model analyzing system 100 also has access to a plurality of databases (not shown) including data collected by an entity, for example, a pharmacy or prescription managing entity. The modeler devices 104 may also access a modeling system (not shown) to create data models. The modeler devices 104 and manager devices 108 are generally computing or mobile computing devices, such as a phone, tablet, laptop, computer, etc. In various implementations, the model database 112, the report database 124, the rules database 128, the data dictionary database 132, or any combination thereof may be included in a single database.

Database Structures

Figure 2:
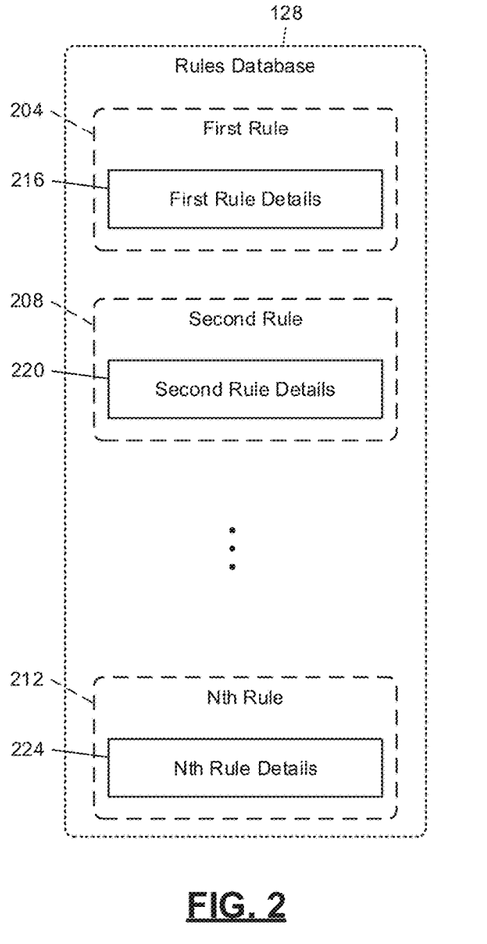
FIG. 2 is an example organization of a rules database according to principles of the present disclosure.

FIG. 2 is an example organization of the rules database 128 according to principles of the present disclosure. The rules database 128 includes a first rule 204, a second rule 208, . . . , and an Nth rule 212. Each rule includes details about the rule. For example, the first rule 204 includes first rule details 216, the second rule 208 includes second rule details 220, and the Nth rule 212 includes Nth rule details 224. In various implementations, the rule details may be included in a separate rule details database. In such an implementation, the rule details would include an indication indicating the corresponding rule associated with the rule details.

Each of the rule details indicate the rule requirements as well as whether violating the rule results in a warning or a failure. As an example, a rule may be that the definition must be populated. The rule details clarify that, to have a definition populated, the definition cannot be null, empty, spaces, or blank. The rule may apply to a variety of attributes within an object of a data model. For example, the definition populated rule may apply to a data model definition, a column comment, a column definition, a table comment, a table definition, a subject area definition, etc. Further, while violating the definition populated rule for a subject area definition may only be a warning, violating the definition populated rule for a data model definition may result in a failure.

Additional rules for data models include: definition length less than 255, no bad characters, no underscore, definition not logical or physical name, logical and physical definitions are the same, new versus old business terms, logical and physical names are not the same, table assigned to subject area, classword exists, classword abbreviation compliant, classword exception, data domain listed, name does not contain articles, array column names end with number, column data lineage exists, data source exists, duplicate names, target data type consistent with source, target data length consistent with source, physical name inherited, named data model, network and systems management used, and table unique relationship.

Figure 3:
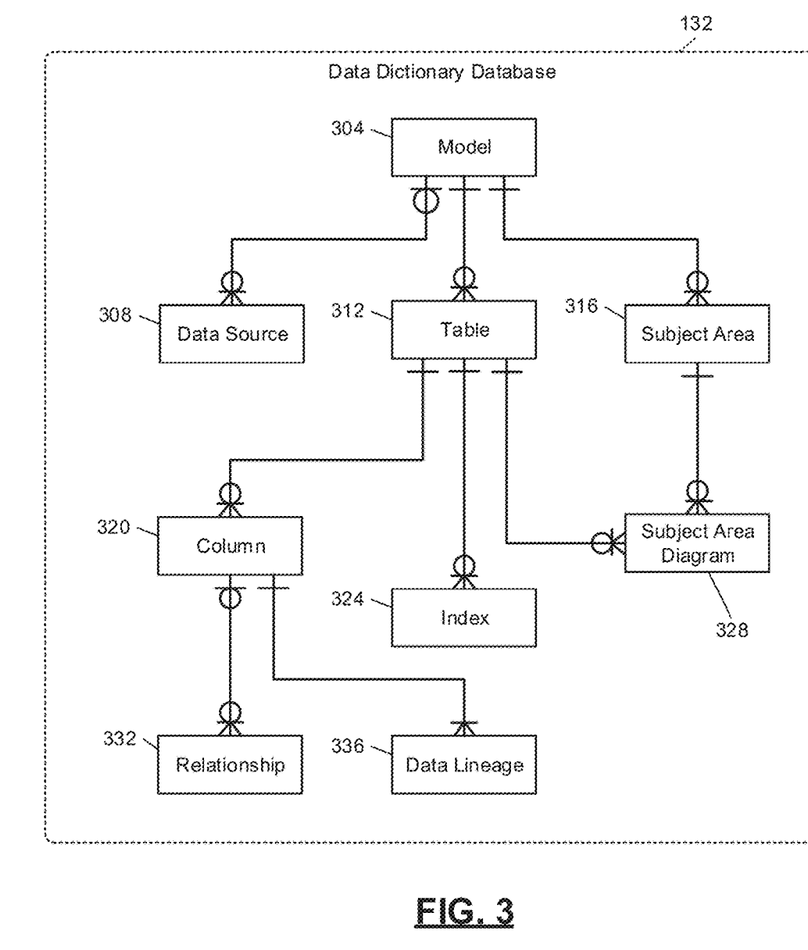
FIG. 3 is an example structure of a data dictionary database according to principles of the present disclosure.

FIG. 3 is an example structure of the data dictionary database 132 according to principles of the present disclosure. The data dictionary database 132 depicts a general overview of a data model and how data models are represented. The data dictionary database 132 includes a model 304 including data model level information as found in the data dictionary generated from the data model. The model 304 is connected to a data source 308 including a listing of all data sources and related metadata within the data model. The connection between the model 304 and the data source 308 indicates that zero or one instances of the model 304 can be associated with zero, one, or many instances of the data source 308.

Additionally, one instance of the model 304 can be associated with zero, one, or many instances of a table 312. The table 312 includes a listing of all table names and associated table metadata. Tables of a data dictionary may include a list of entities. One instance of the model 304 can also be associated with zero, one, or many instances of a subject area 316. The subject area 316 includes subject area level information as found in the data dictionary generated from the data model. The subject area 316 includes a list of model subject areas per data model and the tables contained in that data model subject area.

The table 312 includes connections to a column 320, an index 324, and a subject area diagram 328. One instance of the table 312 can be associated with zero, one, or many instances of the column 320. A data dictionary is used for viewing tables (logical entities) and columns (attributes). The columns can be input into a data modeling standards checking process and can be used as a staging area to other downstream meta-management solutions.

One instance of the table 312 can be associated with zero, one, or many instances of the index 324. The index 324 includes a listing of all indexes within the model 304. One instance of the table 312 can be associated with zero, one, or many instances of the subject area diagram 328. The subject area diagram 328 is a container of table names. Each model contains subject areas as well as a main subject area that holds all the tables. Each subject area contains diagrams and does not contain tables while each diagram contains tables. The tables can be in multiple diagrams while the diagram can belong to only one subject area. Additionally, one instance of the subject area 316 can be associated with zero, one, or many instances of the subject area diagram 328.

The column 320 is connected to a relationship 332 and a data lineage 336. Zero or one instances of the column 320 can be associated with zero, one, or many instances of the relationship 332. The relationship 332 includes data model relationship information. One instance of the column 320 can be associated with one or many instances of the data lineage 336. The data lineage information represents the movement of data from a source data asset, table, and column to a target table and column.

Block Diagram

Figure 4:
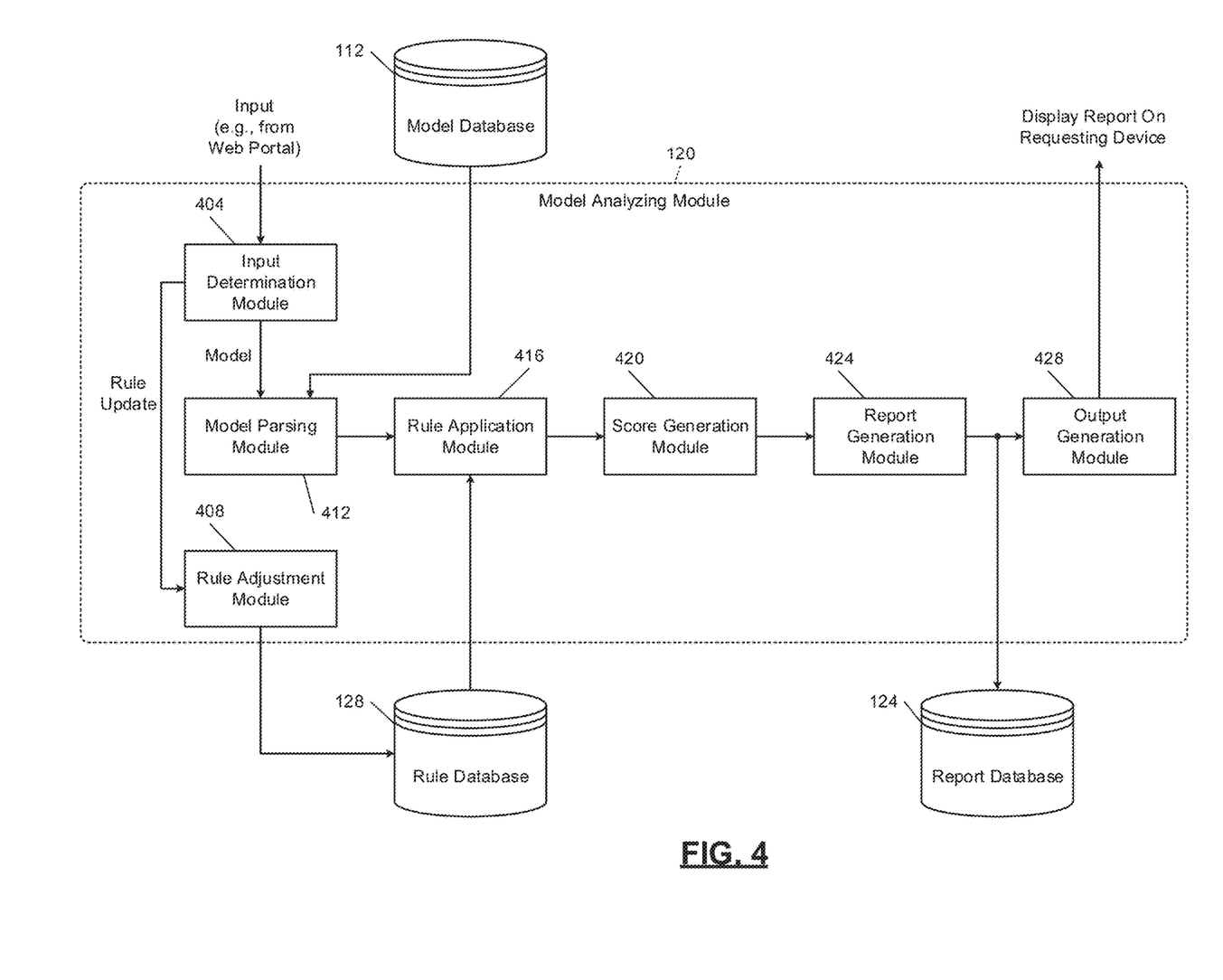
FIG. 4 is a functional block diagram of an example model analyzing module according to principles of the present disclosure.

FIG. 4 is a functional block diagram of an example model analyzing module 120 according to principles of the present disclosure. The model analyzing module 120 receives input from, for example, a web portal via modeler devices 104 or manager devices 108. As noted above, the modeler devices 104 and manager devices 108 are generally computing or mobile computing devices, such as a phone, tablet, laptop, computer, etc. The input may include a request for a report for a particular model or a portion of the particular model. The input may instead be directed to adding a rule to the rules database 128 or removing a rule. In various implementations, the input may be automatically received at predetermined intervals indicating a batch of models. For example, each week a set of completed models may have a report generated automatically for future review of the last week's models.

An input determination module 404 receives the input and determines whether the input indicates a particular model for generating a report or a rule update. If the input indicates a rule update, the input is forwarded to a rule adjustment module 408 to add or remove the rule from the rules database 128. In various implementations, the rule update may change a rule instead of adding to or removing from a rule in the rules database 128. Otherwise, if the input determination module 404 recognizes the input as a request for a report of a particular model, the input is forwarded to a model parsing module 412. The model parsing module 412 obtains the particular model from the model database 112 and identifies each object within the particular model to analyze each object against each rule. In various implementations, the model parsing module 412 may be excluded and the model analyzing module 120 runs the rules against the entire model.

The objects are forwarded to a rule application module 416. The rule application module 416 obtains a plurality of rules from the rules database 128 and runs each rule against each object, including each attribute, of the particular model. The results, whether each rule resulted in a pass, warning, or failure, is forwarded to a score generation module 420. The score generation module 420 determines a score for each set of rules. As noted previously, each rule may belong one of: table definitions, column definitions, and data lineage definitions.

For each category, a percentage adherence is determined. That is, the number of table definition rules that result in a pass is divided by a total number of table definitions. Similarly, the number of column definition rules that result in a pass is divided by a total number of column definitions. The number of data lineage definition rules that result in a pass is divided by a total number of data lineage definitions. Additionally, the score generation module 420 determines an overall health score. The overall health score is determined as a total number of objects without any failures divided by the total number of objects.

Figure 6:
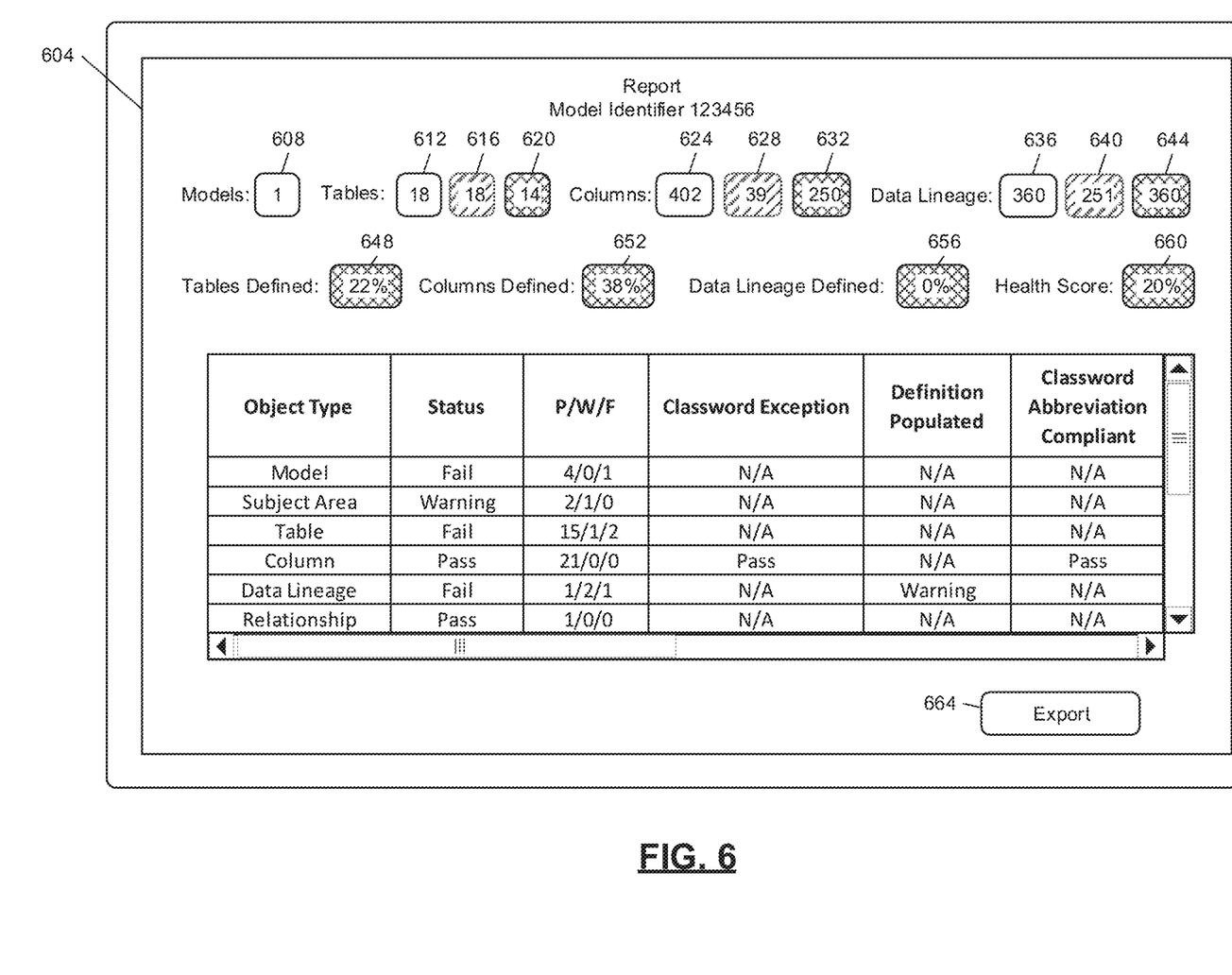
FIG. 6 is an example user interface depicting a report generated by the data model validator of FIG. 5 according to principles of the present disclosure.

The scores and results are forwarded to a report generation module 424 that prepares a report for the particular model. The report includes each pass, warning, and failure for each objects and each attribute of each object. In various implementations, if an object or an attribute of an object is not related to a particular rule, the report includes an "N/A" or not applicable for that object and rule. The report also includes the scores, as shown in FIG. 6. The report is forwarded to an output generation module 428 to display the report on the requesting device. The report is also forwarded to the report database 124 for storage. In various implementations, the modeler devices 104 and manager devices 108 can access reports that have already been run by someone else from the report database 124.

User Interface

Figure 5:
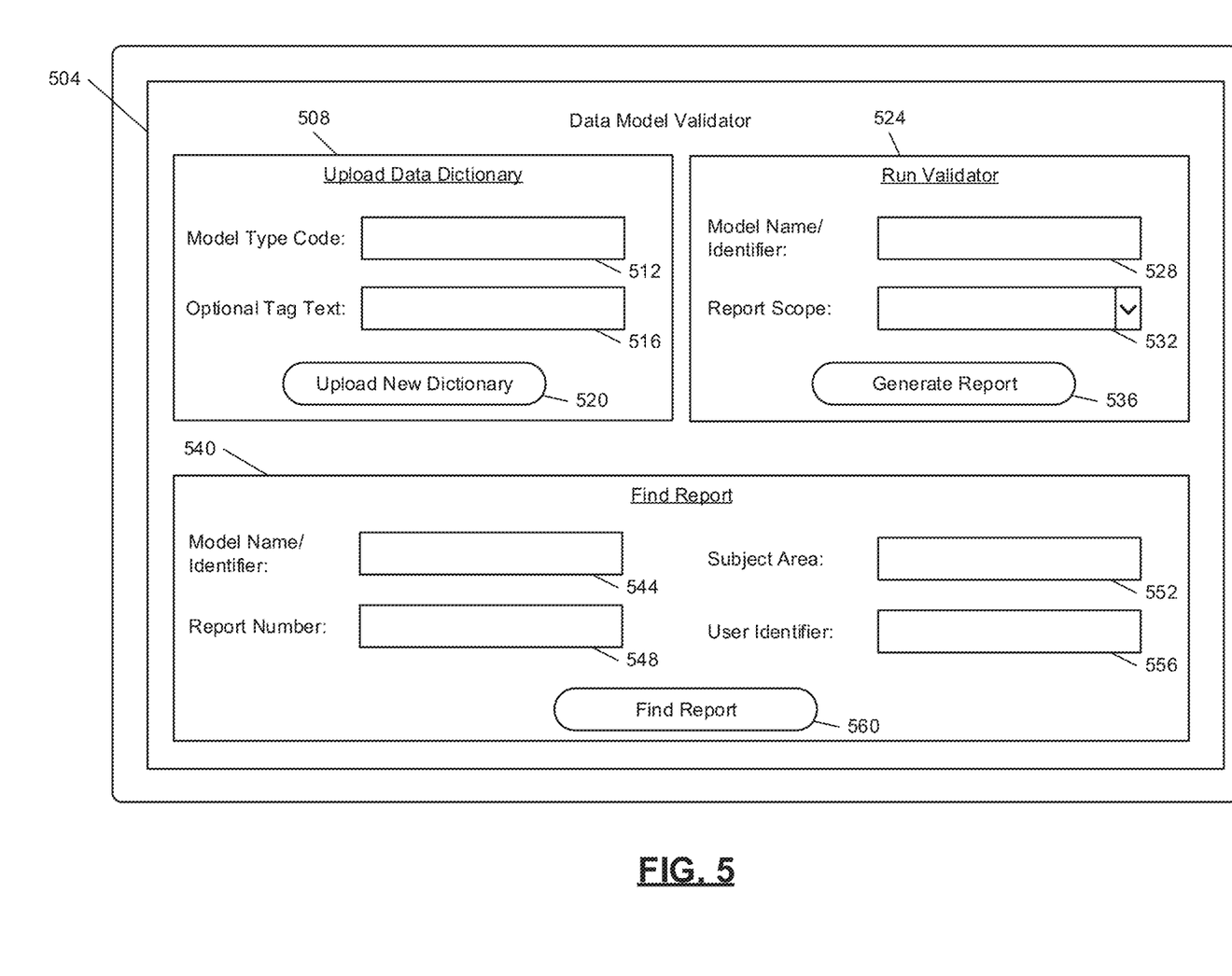
FIG. 5 is an example user interface of a data model validator implementing a model analyzing module according to principles of the present disclosure.

FIG. 5 is an example user interface 504 of a data model validator implementing a model analyzing module according to principles of the present disclosure. The user interface 504 may be displayed on a requesting device, such as a modeler device or manager device (generally a user device). As shown on the user interface 504, the data model validator is a program operating the model analyzing module 120 of FIG. 4.

A first section 508 is an upload data dictionary section where a user inputs a model type code 512 and an optional tag text 516. Once input, the user can select an upload new dictionary button 520 to upload the data dictionary, identified by the model type code 512 and labeled according to the optional tag text 516. For example, the data dictionary shown in FIG. 3 may be uploaded. As mentioned previously, a data dictionary defines elements within a database or a data model, detailing format, relationships, definitions, lineage, etc.

A second section 524 is a run validator section where a user inputs a model name/identifier 528 and may optionally input a report scope 532. Once the user selects a generate report button 536, the data model validator is run, using the model analyzing module, to generate a report on the input model. The report scope 532 allows the user to select a particular section of the model to generate a report for or allows the user to run a report for the entirety of the model. The report scope 532 may be a drop down menu.

A third section 540 is a find report section. The third section 540 provides a way for a user to obtain a previously generated report. The user inputs a model name/identifier 544, a report number 548, a subject area 552, or a user identifier 556. For example, the user may search for reports by the particular model, by a previously generated report number, by a subject area (such as a particular unit or division within the entity), or by a user identifier (searching for reports associated with a specific modeler). Then, the user selects a find report button 560 to obtain the search results.

FIG. 6 is an example user interface 604 depicting a report generated by the data model validator of FIG. 5 according to principles of the present disclosure. The user interface 604 depicts a report for model identifier 123456. The report is an example report that would be stored in the report database or displayed on a requesting device. The report indicates a number of models 608 to which to report corresponds, in this case 1. The report includes a total number of tables 612, here, there are 18 tables; a total number of tables with warnings 616, here, there are 18 tables with warnings; and a total number of tables with failures 620, here, there are 14 tables with failures.

The report includes a total number of columns 624, here, the total number of columns is 402; a total number of columns with warnings 628, here, the total number of columns with warnings is 39; and a total number of columns with failures 632, here, the total number of columns with failures is 250. The report also includes a total number of data lineages 636, here, the total number of columns is 360; a total number of data lineages with warnings 640, here, the total number of data lineages with warnings is 251; and a total number of data lineages with failures 644, here, the total number of data lineages with failures is 360.

The report includes the scores for each category, showing a percentage of tables defined 648, which indicates a number of tables that do not have any failures. In this example, 22% of tables exclude any failures. A percentage of columns defined 652 is 38%, and a percentage of data lineage defined 656 is 0%. Therefore, a health score 660 is 20%. The report includes a table depicting each object type and the number of passes/warnings/failures each model has against the rules of the rules database. The table also includes a column for each rules, listing an N/A if the rule does not apply to the object type and whether the object passed, received a warning, or failed the rule.

In various implementations, the report is color coded, using green to indicate a pass, yellow to indicate a warning, and red to indicate a failure. These colors would be included in the table. For example, the warnings in the table and warnings 616, 628, and 640 would be yellow, while the failures included in the table and the failures 620, 632, and 644, including percentages 648, 652, 656, and 660 falling below a threshold, would be red. In various implementations, the color coding may include other forms of identification, such as shading. The results in the table may also be filtered to show only passes, only warnings, and/or only failures by selecting one of the pass, warning, or failure icons in the table or shown in the scores and/or totals at the top.

Moreover, an export button 664 may be selected to download the report, for example, to an excel spreadsheet. In various implementations, selecting a warning or failure in the table of the report may prompt additional information about the violation of the corresponding rule to be displayed. For example, if the rule is an old versus new business name, selection of the warning indicator in the table may result in the new business name being displayed, so the correct name can be updated. This feature assists in teaching the data modeler about the correct conventions and best practices according to the industry and entity.

Additionally, the report may indicate, in response to the overall health score falling below a threshold, that the particular model will not operate. For example, if the health score falls below a threshold, such as 50%, the health score will be red, indicating the particular model will not operate properly, which is shown in FIG. 6 with the health score being at 20%. In various implementations, the system may include an alert module indicating when a particular model will not operate.

Flowchart

Figure 7A:
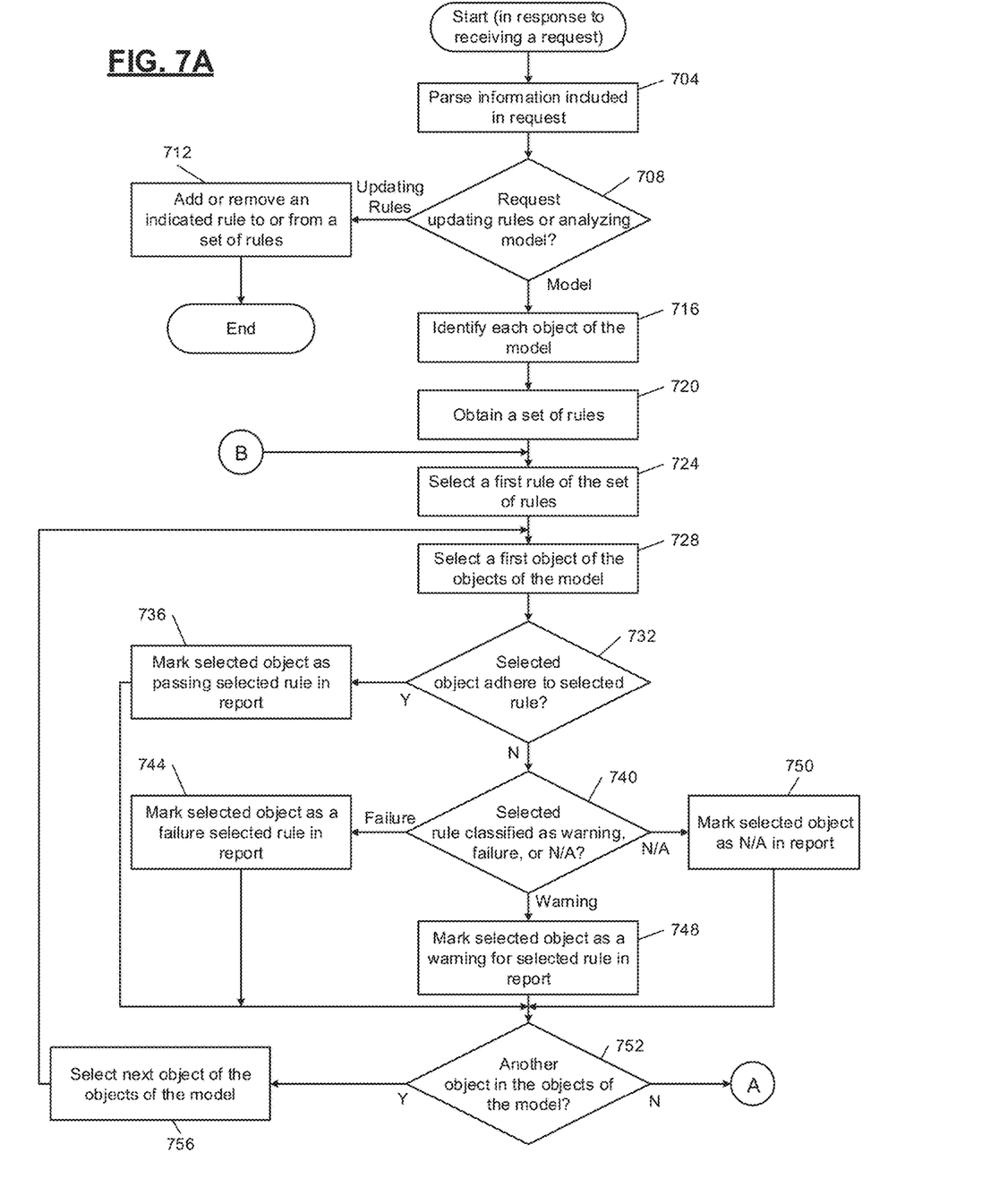
FIGS. 7A-7B are a flowchart depicting example report generation by a model analyzing module according to principles of the present disclosure.
Figure 7B:
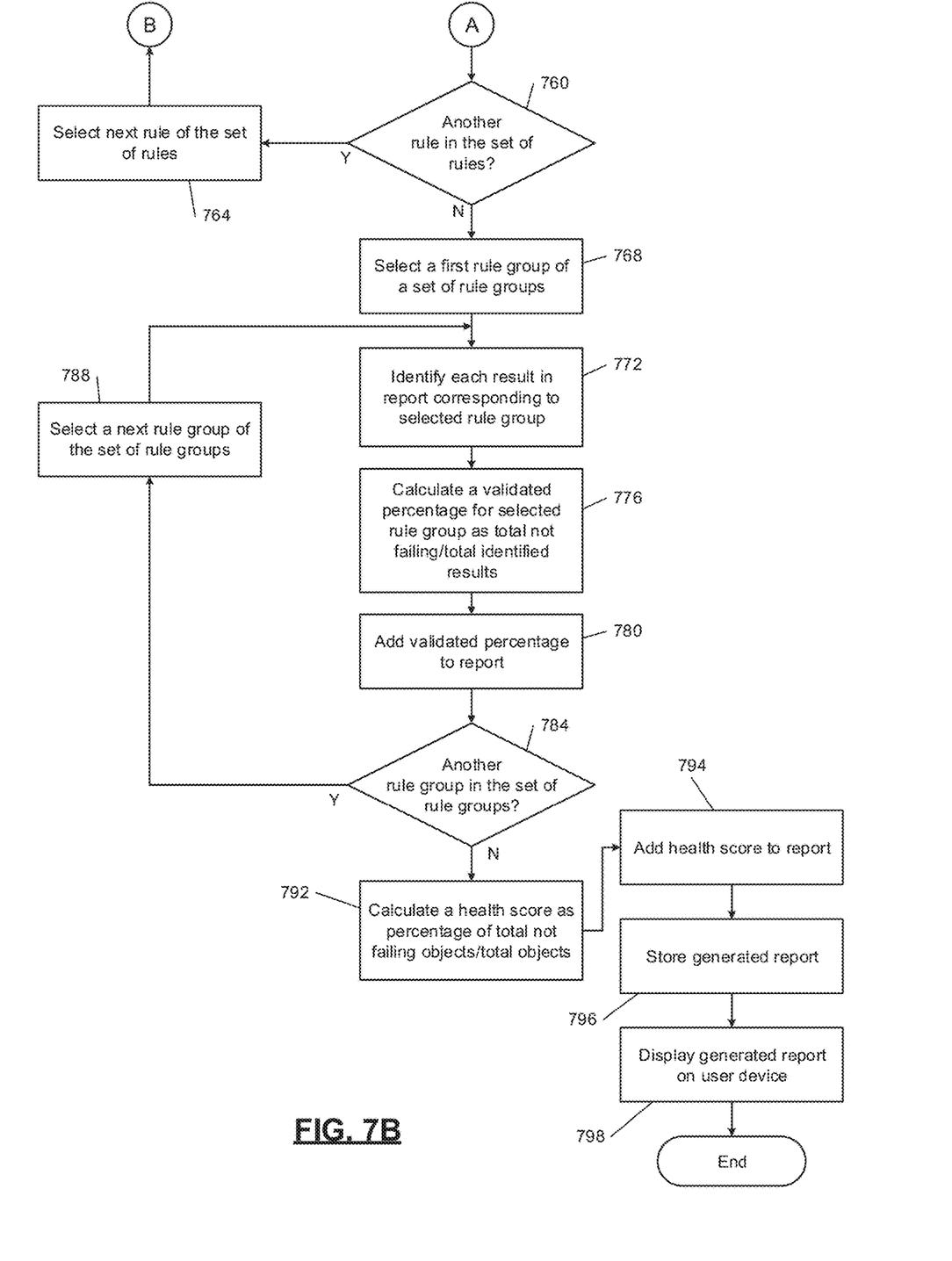

FIGS. 7A-7B are a flowchart depicting example report generation by a model analyzing module according to principles of the present disclosure. Control begins in response to receiving a request, such as a report generation request or an add rule request. At 704, control parses information in the request. At 708, control determines whether the request is to update the rules or analyze an indicated model. If the request indicates updating, such as adding or removing a rule, control proceeds to 712 to add or remove an indicated rule to or from the set of rules. Then, control ends.

Otherwise, if the request indicates a request to analyze a particular model and generate a report, control proceeds to 716 to identify each object of the model. Control continues to 720 to obtain a set of rules, for example, from a rules database. At 724, control selects a first rule of the set of rules. Then, at 728, control selects a first object of the objects of the model. Control continues to 732 to determine if selected object adheres to the selected rule. If yes, control continues to 736 to mark selected object as passing selected rule in the report. Otherwise, if the selected object does not adhere to the selected rule at 732, control continues to 740 to determine if the selected rule is classified as a warning, a failure, or N/A.

If the selected rule is classified as a failure, control proceeds to 744 to mark the selected object as failing the selected rule in the report. Otherwise, if the rule is classified as a warning, control continues to 748 to mark the selected object as a warning for the selected rule in the report. In various implementations, at 740 control determines if the selected rule is relevant to the object and, if not, marks the selected object as not applicable or N/A in the report at 750. Once the selected object for the selected rule is classified as passing at 736, a warning at 748, a failure at 744, or N/A at 750, control continues to 752 to determine if another object is in the objects of the model. If yes, control proceeds to 756 to select a next object of the objects of the model. Then, control returns to 728.

Otherwise, if control determines there is not another object in the objects of the model, control continues to 760 in FIG. 7B. At 760, control determines if another rule is in the set of rules. If yes, control selects a next rule of the set of rules at 764 and returns to 724 in FIG. 7A. In various implementations, the selection of objects versus rules can be switched. The flowcharts of FIGS. 7A and 7B are intended to depict that each rule is run against each object. If control determines at 760 that there is not another rule in the set of rules, control continues to 768 to select a first rule group of a set of rule groups. As previously mentioned and shown in FIG. 6, there may be three categories of rules and corresponding scores: tables defined, columns defined, and date lineage defined. Therefore, the set of rule groups may correspond to these three groupings.

Once a rule group is selected, control continues to 772 to identify each result in the report that corresponds to the selected rule group. Control proceeds to 776 to calculate a validated percentage for the selected rule group as a total number of not failing objects divided by a total number of identified results. For example, for the rule group tables defined, the validated percentage is the total number of columns not failing the definition rules divided by a total number of columns. Then, at 780 control adds the validated percentage to the report. At 784, control determines if another rule group is in the set of rule groups. If yes, control continues to 788 to select a next rule group of the set of rule groups and returns to 772.

Otherwise, if control determines at 784 that another rule group is not in the set of rule groups, control proceeds to 792 to calculate a health score as a percentage of total not failing objects divided by a total number of objects. Then, control continues to 794 to add the health score to the report. At 796, control stores the generate report and continues to 798. At 798, control displays the generated report on the requesting user device. Then, control ends. In various implementations, the health score may be a percentage of a total passing number of objects, to exclude the warnings from the health score.

Conclusion

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. The phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A. The term subset does not necessarily require a proper subset. In other words, a first subset of a first set may be coextensive with (equal to) the first set.

In this application, including the definitions below, the term "module" or the term "controller" may be replaced with the term "circuit." The term "module" may refer to, be part of, or include processor hardware (shared, dedicated, or group) that executes code and memory hardware (shared, dedicated, or group) that stores code executed by the processor hardware.

The module may include one or more interface circuits. In some examples, the interface circuit(s) may implement wired or wireless interfaces that connect to a local area network (LAN) or a wireless personal area network (WPAN). Examples of a LAN are Institute of Electrical and Electronics Engineers (IEEE) Standard 802.11-2016 (also known as the WIFI wireless networking standard) and IEEE Standard 802.3-2015 (also known as the ETHERNET wired networking standard). Examples of a WPAN are IEEE Standard 802.15.4 (including the ZIGBEE standard from the ZigBee Alliance) and, from the Bluetooth Special Interest Group (SIG), the BLUETOOTH wireless networking standard (including Core Specification versions 3.0, 4.0, 4.1, 4.2, 5.0, and 5.1 from the Bluetooth SIG).

The module may communicate with other modules using the interface circuit(s). Although the module may be depicted in the present disclosure as logically communicating directly with other modules, in various implementations the module may actually communicate via a communications system. The communications system includes physical and/or virtual networking equipment such as hubs, switches, routers, and gateways. In some implementations, the communications system connects to or traverses a wide area network (WAN) such as the Internet. For example, the communications system may include multiple LANs connected to each other over the Internet or point-to-point leased lines using technologies including Multiprotocol Label Switching (MPLS) and virtual private networks (VPNs).

In various implementations, the functionality of the module may be distributed among multiple modules that are connected via the communications system. For example, multiple modules may implement the same functionality distributed by a load balancing system. In a further example, the functionality of the module may be split between a server (also known as remote, or cloud) module and a client (or, user) module.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, JavaScript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A system for automated rules-based validation of a first data model, the system comprising:
 at least one processor; and
 a memory coupled to the at least one processor,
 wherein the memory stores:
  a data model database including a plurality of data models that includes the first data model;
  a rules database including a plurality of rules; and
  instructions for execution by the at least one processor, and
 wherein the instructions include, in response to receiving a first input indicating the first data model from a user device of a user:
  obtaining the first data model from the data model database;
  identifying a plurality of objects within the first data model;
  obtaining a set of rules from the rules database;
  determining whether a respective rule of the set of rules applies to a respective object of the plurality of objects;
  in response to a determination that the respective rule applies to the respective object, determining whether the respective object adheres to the respective rule;
  in response to a determination that the respective rule does not apply to the respective object, generating an indication that the respective rule does not apply to the respective object;
  generating a report that indicates at least one of an adherence of the respective object to the respective rule, a violation of the respective object of the respective rule, or whether the respective rule does not apply to the respective object, wherein generating the report includes:
   in response to a determination that the respective object meets a first adherence threshold, displaying the respective object with a first visual emphasis;
   in response to a determination that the respective object meets a second adherence threshold, displaying the respective object with a second visual emphasis; and
   in response to a determination that the respective object meets a third adherence threshold:
    displaying the respective object with a third visual emphasis; and
    displaying a first prompt to modify the respective object;
  calculating an adherence score based on an overall adherence of the plurality of objects to the set of rules;
  transmitting, for display on the user device, the generated report and the adherence score; and
  in response to receiving, from the user device, a second input selecting the respective object in the generated report, transmitting a second prompt to modify the respective object, wherein the second prompt transforms the display to facilitate modification of the respective object.

2. The system of claim 1 wherein calculating the adherence score includes:
 identifying, from the plurality of objects, a total number of objects adhering to each rule of the set of rules, and
 calculating the adherence score as the total number of objects adhering to each rule divided by a total number of the plurality of objects.

3. The system of claim 1 wherein:
 each rule of the set of rules includes an indication of a category of a set of categories, and
 the instructions include calculating a category adherence score for each category of the set of categories by:
  identifying a subset of rules of the set of rules corresponding to a selected category of the set of categories,
  determining a total adherence to the selected category as each object of the plurality of objects adhering to each rule of the subset of rules,
  determining a total number within the selected category as each object of the plurality of objects corresponding to the subset of rules, and
  calculating a selected category adherence score as the total adherence to the selected category divided by the total number within the selected category.

4. The system of claim 1 wherein:
 the memory stores a report database, and
 the instructions include storing the generated report including the adherence score in the report database.

5. The system of claim 4 wherein the instructions include, in response to receiving a report request from the user device:
 obtaining a first report indicated in the report request from the report database, and
 transmitting, for display on the user device, the first report.

6. The system of claim 1 wherein the rules database stores, for each rule of the set of rules, an indication that violation of the rule generates at least one of: a warning and a failure.

7. The system of claim 1 wherein the instructions include:
 in response to receiving a rule add request, adding a rule included in the rule add request to the rules database, and
 in response to receiving a rule delete request, removing a rule included in the rule delete request from the rules database.

8. The system of claim 1 wherein the memory stores:
 a data dictionary including definitions for the plurality of objects.

9. The system of claim 1 wherein the adherence score is calculated based on the overall adherence of the plurality of objects to the set of rules and an overall violation of the plurality of objects of the set of rules indicating a warning.

10. The system of claim 1 wherein the generated report includes a table including:
 each object of the plurality of objects and each rule of the plurality of rules, and
 an indication of a pass, warning, or failure of the plurality of objects for the set of rules.

11. The system of claim 1 wherein the overall adherence of the plurality of objects to the set of rules includes a violation of an object of the plurality of objects of a rule of the set of rules for each rule of the set of rules that indicates the violation of the object of the rule is a warning.

12. A method for automated rules-based validation of a first data model, the method comprising:
in response to receiving a first input indicating the first data model from a user device of a user, obtaining the first data model from a data model database, wherein the data model database stores a plurality of data models that include the first data model;
identifying a plurality of objects within the first data model;
obtaining a set of rules from a rules database, wherein the rules database stores a plurality of rules;
determining whether a respective rule of the set of rules applies to a respective object of the plurality of objects;
in response to a determination that the respective rule applies to the respective object, determining whether the respective object adheres to the respective rule;
in response to a determination that the respective rule does not apply to the respective object, generating an indication that the respective rule does not apply to the respective object;
generating a report that indicates at least one of an adherence of the respective object to the respective rule, a violation of the respective object of the respective rule, or whether the respective rule does not apply to the respective object, wherein generating the report includes:
in response to a determination that the respective object meets a first adherence threshold, displaying the respective object with a first visual emphasis;
in response to a determination that the respective object meets a second adherence threshold, displaying the respective object with a second visual emphasis;
in response to a determination that the respective object meets a third adherence threshold:
displaying the respective object with a third visual emphasis; and
displaying a first prompt to modify the respective object;
calculating an adherence score based on an overall adherence of the plurality of objects to the set of rules;
transmitting, for display on the user device, the generated report and the adherence score; and
in response to receiving, from the user device, a second input selecting the respective object in the generated report, transmitting a second prompt to modify the respective object, wherein the second prompt transforms the display to facilitate modification of the respective object.

13. The method of claim 12 wherein calculating the adherence score includes:
identifying, from the plurality of objects, a total number of objects adhering to each rule of the set of rules, and
calculating the adherence score as the total number of objects adhering to each rule divided by a total number of the plurality of objects.

14. The method of claim 12 further comprising calculating a category adherence score for each category of a set of categories by:
identifying a subset of rules of the set of rules corresponding to a selected category of the set of categories, wherein each rule of the set of rules includes an indication of a category of the set of categories;
determining a total adherence to the selected category as each object of the plurality of objects adhering to each rule of the subset of rules;
determining a total number within the selected category as each object of the plurality of objects corresponding to the subset of rules; and
calculating a selected category adherence score as the total adherence to the selected category divided by the total number within the selected category.

15. The method of claim 12 further comprising storing the generated report including the adherence score in a report database.

16. The method of claim 15 further comprising, in response to receiving a report request from the user device:
obtaining a first report indicated in the report request from the report database, and
transmitting, for display on the user device, the first report.

17. The method of claim 12 wherein the rules database stores, for each rule of the set of rules, an indication that violation of the rule generates at least one of: a warning and a failure.

18. The method of claim 12 further comprising:
in response to receiving a rule add request, adding a rule included in the rule add request to the rules database, and
in response to receiving a rule delete request, removing a rule included in the rule delete request from the rules database.

19. The method of claim 12 wherein the adherence score is calculated based on the overall adherence of the plurality of objects to the set of rules and an overall violation of the plurality of objects of the set of rules indicating a warning.

20. The method of claim 12 wherein the generated report includes a table including:
each object of the plurality of objects and each rule of the plurality of rules, and
an indication of a pass, warning, or failure of the plurality of objects for the set of rules.

* * * * *